United States Patent
Tian et al.

(10) Patent No.: US 8,228,491 B2
(45) Date of Patent: Jul. 24, 2012

(54) PRECISION APPROACH PATH INDICATOR FIELD TESTING INSTRUMENT

(76) Inventors: Rongsheng Tian, Santa Clara, CA (US); Yong Tian, Cupertino, CA (US)

(*) Notice: Subject to any disclaimer, the term of this patent is extended or adjusted under 35 U.S.C. 154(b) by 313 days.

(21) Appl. No.: 12/592,557

(22) Filed: Nov. 27, 2009

(65) Prior Publication Data

US 2010/0132433 A1   Jun. 3, 2010

Related U.S. Application Data

(60) Provisional application No. 61/200,452, filed on Nov. 28, 2008.

(51) Int. Cl.
 *G01B 11/26* (2006.01)
(52) U.S. Cl. ....................................... 356/139.1; 356/72
(58) Field of Classification Search .................. 340/995, 340/988, 984; 356/72, 138, 139.1, 139.04, 356/141.3; 315/19; 362/276
 See application file for complete search history.

(56) References Cited

U.S. PATENT DOCUMENTS

| | | | | |
|---|---|---|---|---|
| 4,170,767 A * | 10/1979 | Tanner | ........................... | 340/955 |
| 4,430,695 A * | 2/1984 | Payne et al. | ................... | 362/277 |
| 7,755,513 B2 * | 7/2010 | Wang et al. | .................... | 340/955 |
| 2011/0032519 A1 | 2/2011 | Coletti et al. | | |

* cited by examiner

*Primary Examiner* — Layla Lauchman
(74) *Attorney, Agent, or Firm* — Bright IP Law Offices

(57) ABSTRACT

The Field Testing Instrument (FTI) is designed for use in the regular maintenance and installation of airport Precision Approach Path Indicator (PAPI). The FTI is a self-contained and portable instrument that accurately measures the most important PAPI parameters, such as vertical aiming angle, transition angle, and light intensity. In addition to working with the current incandescent PAPIs, the FTI also measures parameters specific to the next generation LED PAPI. The FTI uses modern, efficient technology to reduce the life-cycle cost of approach lighting systems. The FTI improves on traditional PAPI testing methods by directly measuring the PAPI light beam focused to a target plate, as if seen from the pilot perspective. Due to significantly improvements in measurement accuracy and reliability, the FTI may supplement and even replace costly flight checks for PAPI maintenance with ground based operation.

13 Claims, 2 Drawing Sheets

PRECISION APPROACH PATH INDICATOR FIELD TESTING INSTRUMENT

REFERENCE TO RELATED APPLICATIONS

The present application claims priority to the provisional Appl. Ser. No. 61/200,452 filed on Nov. 28, 2008, the entire content of which is hereby incorporated by reference.

FIELD OF THE INVENTION

This invention generally relates to technologies for visual navigational aids maintenance, and more specifically to the field testing of Precision Approach Path Indicator (PAPI).

BACKGROUND OF THE INVENTION

The PAPI (and VASI) system relies on the color variation of a multi-beam light to guide an aircraft to land with the correct glide slope. Due to the sensitive nature of landing operations, FAA has mandated regular testing and maintenance of PAPI systems. Among the FAA regulations and requirements are the following:

Order 6850_5c Maintenance of Lighted Navigational Aids
So_certalert_0204 VASI/PAPI Maintenance
PAPI Operational Safety Assessment The three most important parameters of the PAPI light beam to be checked are the following:

1. Light Beam Vertical Aiming Angle

If the angle is lowered from the set angle for some reason, landing aircraft descends below the glide path and may hit obstacle. If raised, the landing aircraft descends from the steeper angle and may have increased chance of accident.

2. Light Intensity

Light intensity determines whether the PAPI lights are visible at a distance of 3 miles by day and 20 miles by night, as required by FAA.

3. Transition Angle

FAA mandates a 3 minute transition zone separating the red and white light. The landing pilot will read ambiguous signal if the aircraft is flying at a height within the transition zone, thus increasing chances of error.

There are three more important parameters:

4. Light Intensity Distribution

While the current generation of PAPI uses incandescent light bulbs, the light intensity is evenly distributed, so taking one measurement works well. However, the next generation LED PAPI uses an array of LEDs as light source. The LEDs may fail individually and impact the particular area the PAPI light beam. Thus, it's more important to measure the light intensity distribution for the LED based PAPI systems.

5. Horizontal Tilt Angle

As required by FAA, the PAPI light beam covers a horizontal arc 10 degrees to the left of its central axis and 10 degrees to the right. Any horizontal tilt in the PAPI Light Housing Assembly (LHA) or its optical path, the height of red white transition line to the left of axis may differ from the height on the right side. The result is error in the peripheral glide path, even though the central axial glide path is correct.

6. Transition Angle Distribution

Similar to the horizontal tilt angle, due to imperfections in the optical system, the PAPI light beam red white transition angle on the ends of its horizontal arc may be more dispersed transition angle on the central axis.

The traditional testing methods include both ground-based and flight-based techniques, each with its own set of pros and cons.

1. In the basic test, the operator uses either a bubble or digital style aiming device to checks aiming angle of the LHA housing. Since the PAPI light beam is not directly measured, there may be error should the LHA case and light source or optical lens are misaligned. The PAPI light beam transition angle and light intensity is not measured.

2. In the more advanced test, the operator directly measures the PAPI light beam by mounting a theodolite on top of the LHA and erecting the staff 20 to 30 paces in front of the LHA. This test measures the true light beam optical aiming angle, however, because the observation is so close to the PAPI, the transition angle and light intensity distribution cannot be accurately measured.

In laboratory setting, the operator may measure the transition angle using the same setup, but take measurement much further, about 1000 feet away. However, this is unpractical for field testing.

3. The flight check gives accurate measurement of the PAPI light beam, as a pilot would use the system, but it's too costly for frequent testing cycles, such as monthly.

The proposed PAPI Field Testing Instrument (FTI) significantly improved upon the existing testing method. The FTI offers direct optical measurement of the PAPI light beam by collecting the beam and focusing it on a target plate. The light beam image on the target plate is the same as if viewed by the pilot from a distance. From the target plate, accurate and quantitative measurements are taken for the PAPI light beam vertical aiming angle, transition angle, light intensity distribution, and horizontal tilt angle. The PAPI FTI design and operation is described in the following sections.

The PAPI FTI is designed as a self contained package, easy to use, ruggedized, cost effective, and highly portable. In addition to regular airport maintenance, the FTI can also be used by the FAA Technical Center to certify new PAPI models and acceptance testing, and by PAPI manufactures for Quality Assurance test before shipment.

SUMMARY OF THE INVENTION

The key advantages of PAPI FTI versus tradition testing methods are listed in the following table.

|  | PAPI FTI | Aiming device | Theodolite/ staff | Flight check |
|---|---|---|---|---|
| Vertical aiming angle | Y | indirect | Y | Y |
| Light intensity | Y | separate test | separate test | Y |
| Transition angle | Y | N | N | Y |
| Intensity distribution | Y | N | N | Y |
| Horizontal tilt angle | Y | indirect | N | Y |
| Transition angle distribution | Y | N | N | Y |
| Quantitative result | Y | Y | partial | Partial |
| Operating cost | Low | low | low | High |
| Easy of operation | Easy | easy | medium | Difficult |

The FTI improves on traditional PAPI testing methods by directly measuring the PAPI LHA light beam. The FTI has a cylindrical shape, including: a focal lens at one end, a target plate at the other end, three adjustable legs, inclinometers, control board, light sensors, and a controller board. In a typical usage case, the operator places FTI in front of the LHA, and the PAPI light beam is focused to the target plate, allowing the measurement to be taken as if seen from the pilot perspective.

On the target plate are two slanted slits from which the focused LHA light beam are viewed from. The operator may center the light beam transition line on the slits by adjusting the leg heights. Once centered, the inclinometer reads the vertical aiming angle of the light beam. The slant slits magnified the light beam's red white transition line width and the operator may reads width from a scale marking on the slanted slits. Also attached on the target plate is an array of ambient light sensors which measure the PAPI light beam intensity distribution.

DETAILED DESCRIPTION OF THE INVENTION

Figure 1:
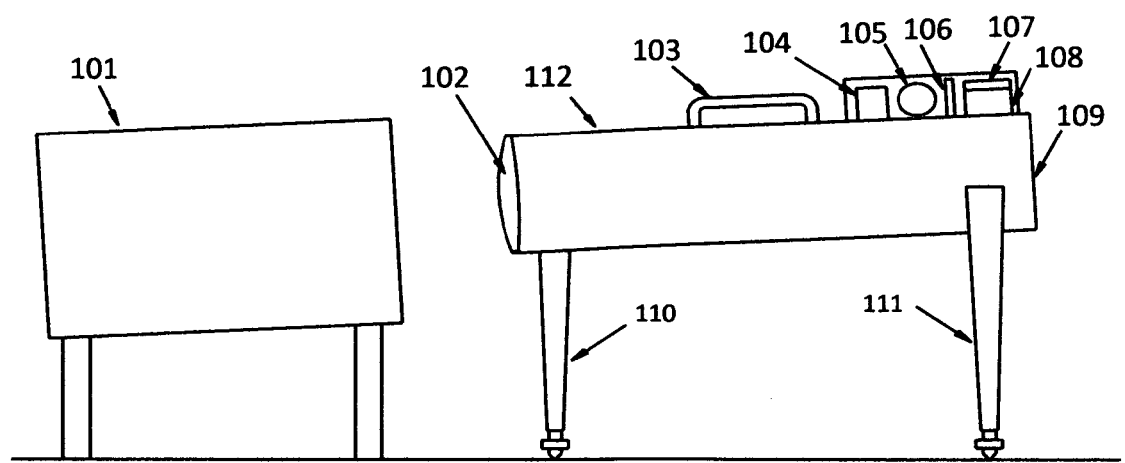
FIG. 1 illustrates a side view of the PAPI Field Testing Instrument, including the instrument's position relative to the PAPI LHA in a typical usage case.

While the present invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation or restriction of the scope of the invention is thereby intended. Any alterations and further implementations of the principles of the invention as described herein are contemplated as would normally occur to one skilled in the art to which the invention relates.

The proposed PAPI Field Testing Instrument (FTI) has a cylindrical shape, measuring approximately 23 inches in length by 8 inches in diameter. The PAPI FTI is shown in detail in FIG. 1, FIG. 2, FIG. 3 and FIG. 4.

FIG. 1 shows the PAPI FTI (112) side view, including: a focal lens (102), a target plate (109), an electronic horizontal incline angle sensor (104), an electronic vertical incline angle sensor (105), a control board (106), batteries (108), cylindrical case with handle (103), and three adjustable legs (110, 111). A compass (107) is used for measure the PAPI orientation and measures the beam parameters at different orientation. The target plate (109) is located at the focal plane of the focal lens (102).

Figure 2:
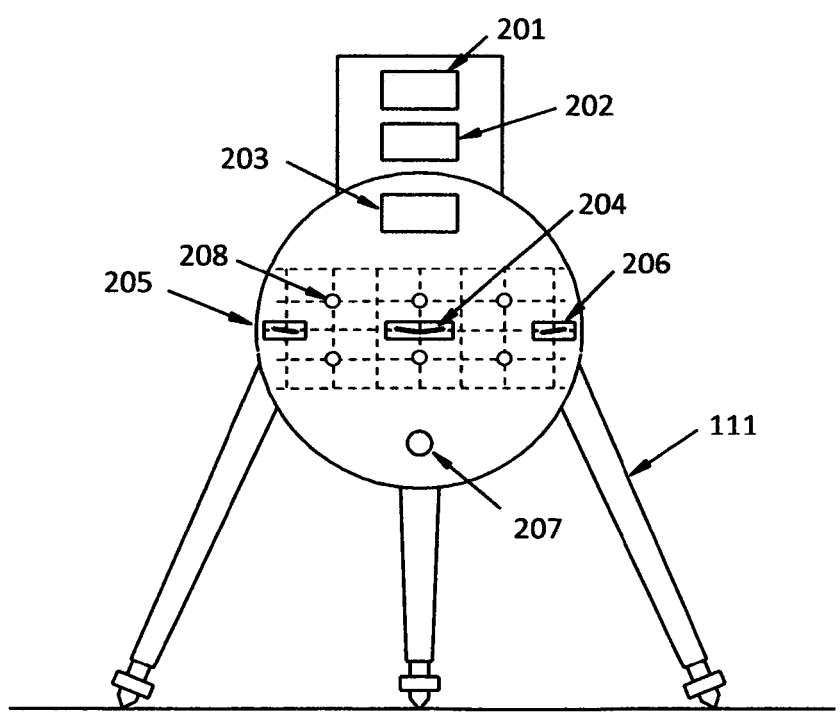
FIG. 2 illustrates the front view PAPI Field Testing Instrument, looking at the target plate end of the cylinder.

FIG. 2 shows the PAPI FTI (112) front view, from the target plate (109) end of the cylinder, according to one embodiment of the present invention. There is a digital display (201) which shows the horizontal incline angle; a digital display (202) shows the vertical incline angle. There is an array of ambient light sensors (208) which measure the PAPI light beam intensity distribution. A switch selects which sensor's intensity measurement to display on the digital meter (203). The middle pair of slanted slits (204) is used to measure the vertical aiming angle and transition angle at center of the PAPI light beam, and the side pair of slanted slits (205 and 206) are used to measure the angles at the edges of the PAPI light beam. The hole (207) is used for light sensor calibration where a standard traceable light sensor can be inserted.

The PAPI FTI (112) has three adjustable legs on the bottom, with one leg (110) mounted on the lens end and two legs (111) on the target plate (109) end. The legs are foldable for easy portability and storage.

For the PAPI test and maintenance, the FTI operator follows a simple two-step process. The process for one LHA is described as follows. For a complete PAPI system, the same process is repeated four times, once for each LHA. In addition, if a LHA contains several lenses, procedure is repeated for each lens.

The first step is to setup the FTI (112) in front of the LHA (101), which follows the process below:

a) Turn off the PAPI LHA b) Initial placement—set the PAPI FTI at the front of the LHA (101), with the lens end (102) facing the LHA. Adjust the supporting leg (110) height to match the LHA, and center FTI on the LHA projection lens, such that all light from the LHA is collected by the FTI.

c) Horizontal aiming alignment—Keep the lens end of FTI fixed and rotate the FTI body horizontally to align it with the horizontal aiming angle of the LHA light beam. Use the compass (107) to read the FTI horizontal orientation and match it precisely with that of the LHA. With the single support leg (110) as a pivot, it should be easy to rotate the FTI.

d) Turn on the PAPI LHA

After setup, the second step is to take measurements, including the following parameters:

a) Vertical Aiming angle—With the operator observing from the target plate (109) end of the FTI, the PAPI light is visible on the target plate (109). Adjust the two supporting leg (111) heights such that the red-white transition line is centered on the middle pair of slanted slits (204). The slanted slit center is clearly labeled and marked.

At this point, the digital display (202) shows the vertical aiming angle of the LHA. Check the reading against the LHA set angle.

b) Horizontal tilt angle—If needed, adjust the two supporting leg (111) heights such that the red-white transition line is also centered on the two side slanted slits (205 and 206). At this point, the digital display (201) shows the horizon tilt angle of the LHA light beam.

c) Transition angle—The red-white transition line is easy to see, but difficult to measure its width, since it corresponds to less than 3 min of arc. The PAPI FTI uses the slanted slits (204, 205 and 206) as a magnifier to make the width measureable. The slits (204, 205 and 206) are slightly slanted and much narrower than the transition line on the target plate (109). The intersection between each slit and transition line is wider horizontally than vertically, which amplify the width horizontally. The magnification is depended on the slanted tilt angle, i.e. if $\alpha$ is the slit slant angle, then the amplification factor $M=1/\tan \alpha$. The amplified transition line width is read out from the scale marks on the slits and the corresponding transition angle is also marked.

According to one embodiment of the present invention, to achieve higher accuracy, the slits (204, 205 and 206) are replaced by color CCD sensors. According to another embodiment of the present invention, the slits (204, 205 and 206) are replaced by rod lenses. By measuring the intensity ratio between red light and white light, the FTI can better qualify the transition line than the naked human eye.

d) Transition angle distribution

In addition to check the transition angle in the light beam central axis using the middle pair of slits (204), the transition angles at the either side of the PAPI light beam are also measure by the side pair of slits (205 and 206).

e) Light intensity distribution

The FTI measures the PAPI light beam intensity distribution by an array of ambient light sensors (208) on the target plate (109). The operator uses a switch to select which sensor's measurement to be displayed on the digital meter (203).

If a LHA includes several projection lenses, repeat the measurement for all projection lenses. The light intensity from a LHA is the total light intensity from all projection lenses. The transition angle is the average transition angle from the all projection lenses plus the difference among the all aiming angles.

To ensure accuracy the PAPI FTI itself, the FTI can be calibrated by accessories. The accessory generates a laser beam with zero degree and 3 degrees in vertical to calibrate the inclinometer. A traceable calibrated light sensor can be used to calibrate the light sensors inside the FTI.

Figure 3:
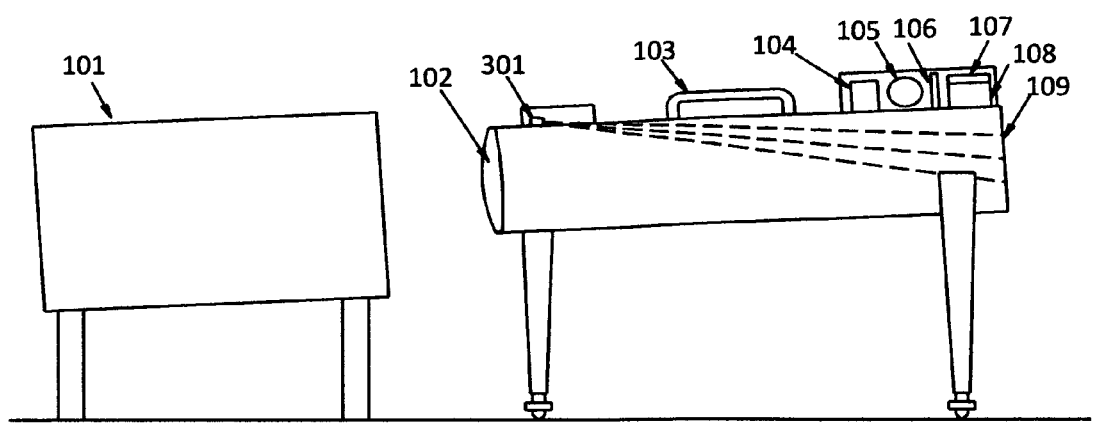
FIG. 3 shows a side view of a precision approach path indicator field testing instrument with a high resolution camera.

According to another embodiment of the present invention as shown in FIG. 3, the PAPI FTI (112) may include: a focal lens (102), a target plate (109), a high resolution color CCD camera (301), an electronic horizontal incline angle sensor (104), an electronic vertical incline angle sensor (105), a control board (106), batteries (108), case with handle (103) and three adjustable legs (110, 111). The present embodiment illustrated in FIG. 3 has an additional high resolution color CCD camera (301) as compared to the embodiment shown in FIG. 1. The light beam emitted by the PAPI is focused by the focal lens (102) onto the target plate (109). The target plate (109) reflects the light beam onto the high resolution color CCD camera (301) as illustrated by the three dashed lines in FIG. 3. During the test a microcontroller on the control board (106) is used to calculate the vertical aiming angle, horizontal tilt angle, transition angles, transition angle distribution and light intensity distribution based the data collected by the high resolution color CCD camera (301). According to this embodiment, neither the slanted slits (204, 205 and 206) nor the array of ambient light sensors (208) shown in FIG. 2 are needed on the target plate (109).

Figure 4:
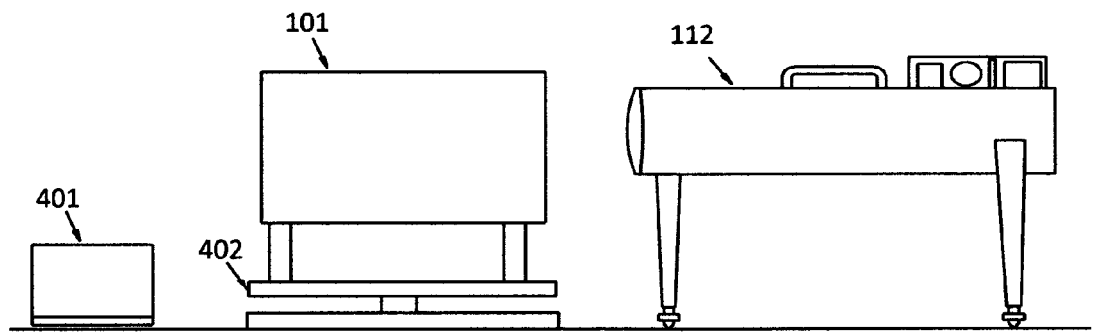
FIG. 4 shows a side view of a precision approach path indicator test station.

According to yet another embodiment of the present invention as shown in FIG. 4, a PAPI test station includes: a computer (401), rotatable platform (402) and a PAPI FTI (112). The tested PAPI LHA (101) is placed on the rotatable platform (402). In this embodiment, a color CCD sensor is located in the center of the target plate (109). Because the LHA (101) can be rotated by the platform (402), the color CCD sensor at the center of the target plate (109) can be used to measure both the transition angles at the center and either side of the PAPI light beam, and a pair of side CCD sensors is not needed according to this embodiment of the invention. The PAPI FTI (112) still has an array of ambient light sensors located at the focal point of the focal lens (102), which is on the target plate (109). The computer (401) controls the rotatable platform (402), and collects and analyses the data from FTI (112). The data include: output from the color CCD sensor and the array of ambient light sensors.

While one or more embodiments of the present invention have been illustrated above, the skilled artisan will appreciate that modifications and adoptions to those embodiments may be made without departing from the scope and spirit of the present invention.

What is claimed is:

1. A portable instrument used for testing a precision approach path indicator (PAPI), comprising:
    a cylindrical case having a first end and a second end that is opposite the first end;
    a focal lens located near the first end of the cylindrical case, wherein the focal lens is responsible for introducing a light beam emitted by the precision approach path indicator (PAPI) into the cylindrical case;
    a target plate located at a focal point of the focal lens near the second end of the cylindrical case, wherein the target plate is responsible for receiving the light beam emitted by the precision approach path indicator (PAPI) and determining one or more parameters associated with the precision approach path indicator (PAPI);
    an electronic horizontal incline angle sensor attached to the cylindrical case for determining a horizontal incline angle of the precision approach path indicator (PAPI); and
    an electronic vertical incline angle sensor attached to the cylindrical case for determining a vertical incline angle of the precision approach path indicator (PAPI).

2. The portable instrument of claim 1, wherein the target plate includes an array of ambient light sensors for determining a light intensity distribution of the light beam emitted by the precision approach path indicator (PAPI) and means for determining the one or more parameters associated with the precision approach path indicator (PAPI), including: a vertical aiming angle, a horizontal tilt angle, a red-white transition angle, and a red-white transition angle distribution.

3. The portable instrument of claim 2, wherein the means includes a first pair of slanted slits at a center of the target plate and a second pair of slanted slits at a predefined distance away from the center of the target plate, each slit having an associated scale, and the first and the second pair of slanted slits are oriented symmetrically with respect to a vertical plane at the center of the target plate, respectively.

4. The portable instrument of claim 2, wherein the means includes a first color charge-coupled device (CCD) sensor at a center of the target plate and a second and a third color CCD sensors at a predefined distance away from the center of the target plate, wherein the pair of color CCD sensors are positioned symmetrically with respect to a vertical plane at the center of the target plate.

5. The portable instrument of claim 2, wherein the means includes a rod lens at a center of the target plate and a pair of rod lens at a predefined distance away from the center of the target plate, wherein the pair of rod lens are positioned symmetrically with respect to a vertical plane at the center of the target plate.

6. The portable instrument of claim 2, further comprising a control board attached to the cylindrical case, wherein the control board includes a temperature compensation circuit for calibrating the electronic horizontal incline angle sensor and the electronic vertical incline angle sensor.

7. The portable instrument of claim 1, further comprising a high resolution color CCD camera for collecting light beam emitted by the precision approach path indicator (PAPI) and reflected by the target plate.

8. The portable instrument of claim 7, further comprising a control board attached to the cylindrical case, wherein the control board includes a microcontroller used to calculate the one or more parameters associated with the precision approach path indicator (PAPI) based on the image data collected by the high resolution color CCD camera, the one or more parameters including: a vertical aiming angle, a horizontal tilt angle, a red-white transition angle, a red-white transition angle distribution, and a light intensity distribution of the light beam emitted by the precision approach path indicator (PAPI).

9. The portable instrument of claim 1, further comprising three adjustable legs attached to the cylindrical case, wherein the three adjustable legs include a first adjustable leg near the first end of the cylindrical case and a pair of adjustable legs near the second end of the cylindrical case.

10. The portable instrument of claim 1, further comprising a handle attached to the cylindrical case.

11. The portable instrument of claim 1, wherein the precision approach path indicator (PAPI) is placed on a rotatable platform for determining the one or more parameters associated with the precision approach path indicator (PAPI).

12. The portable instrument of claim 11, wherein the target plate includes an array of ambient light sensors for determining a light intensity distribution of the light beam emitted by the precision approach path indicator (PAPI) and a color CCD sensor near a center of the target plate for determining the one or more parameters associated with the precision approach path indicator (PAPI), including: a vertical aiming angle, a horizontal tilt angle, a red-white transition angle, and a red-white transition angle distribution.

13. The portable instrument of claim 12, wherein a computer is used to control the rotatable platform and process data collected by the array of ambient light sensors and the color CCD sensor.

* * * * *